Feb. 20, 1968     H. J. BARRY     3,370,267
BEAM FORMING SYSTEM
Filed Oct. 23, 1965                                            4 Sheets—Sheet 1
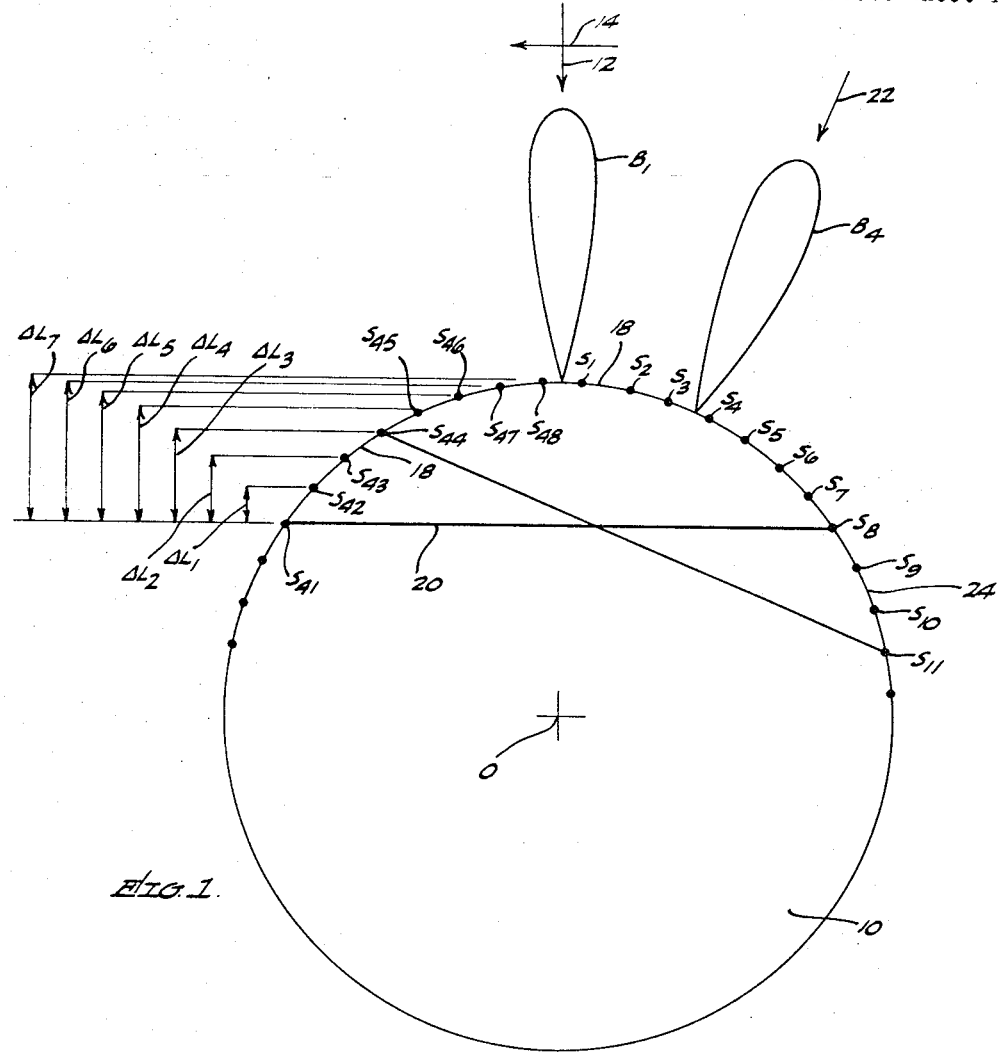
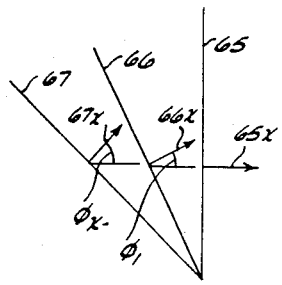
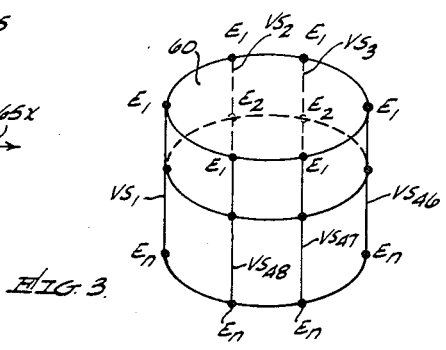
INVENTOR.
HARRY J. BARRY,
BY J. H. Haskell
ATTORNEY.

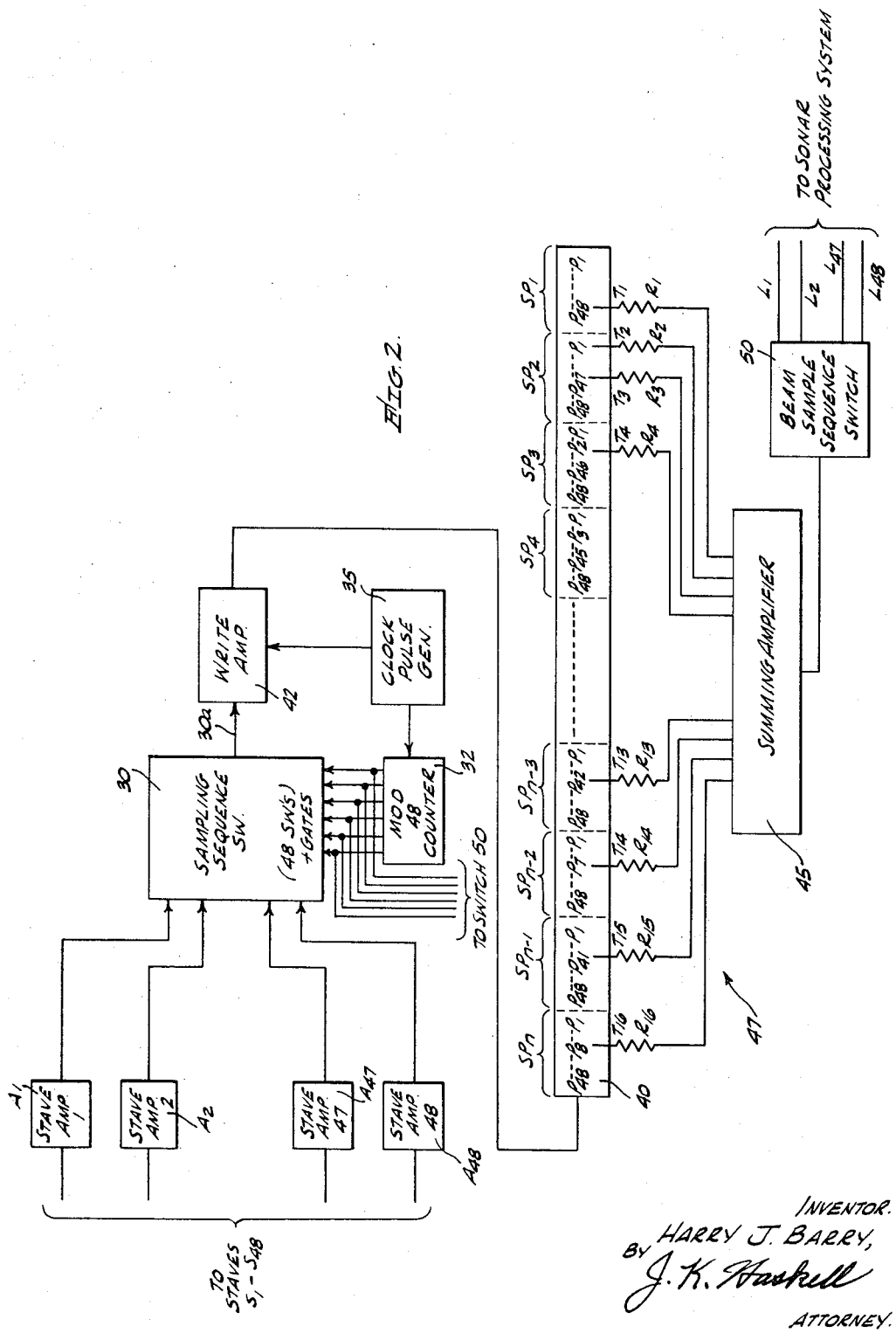

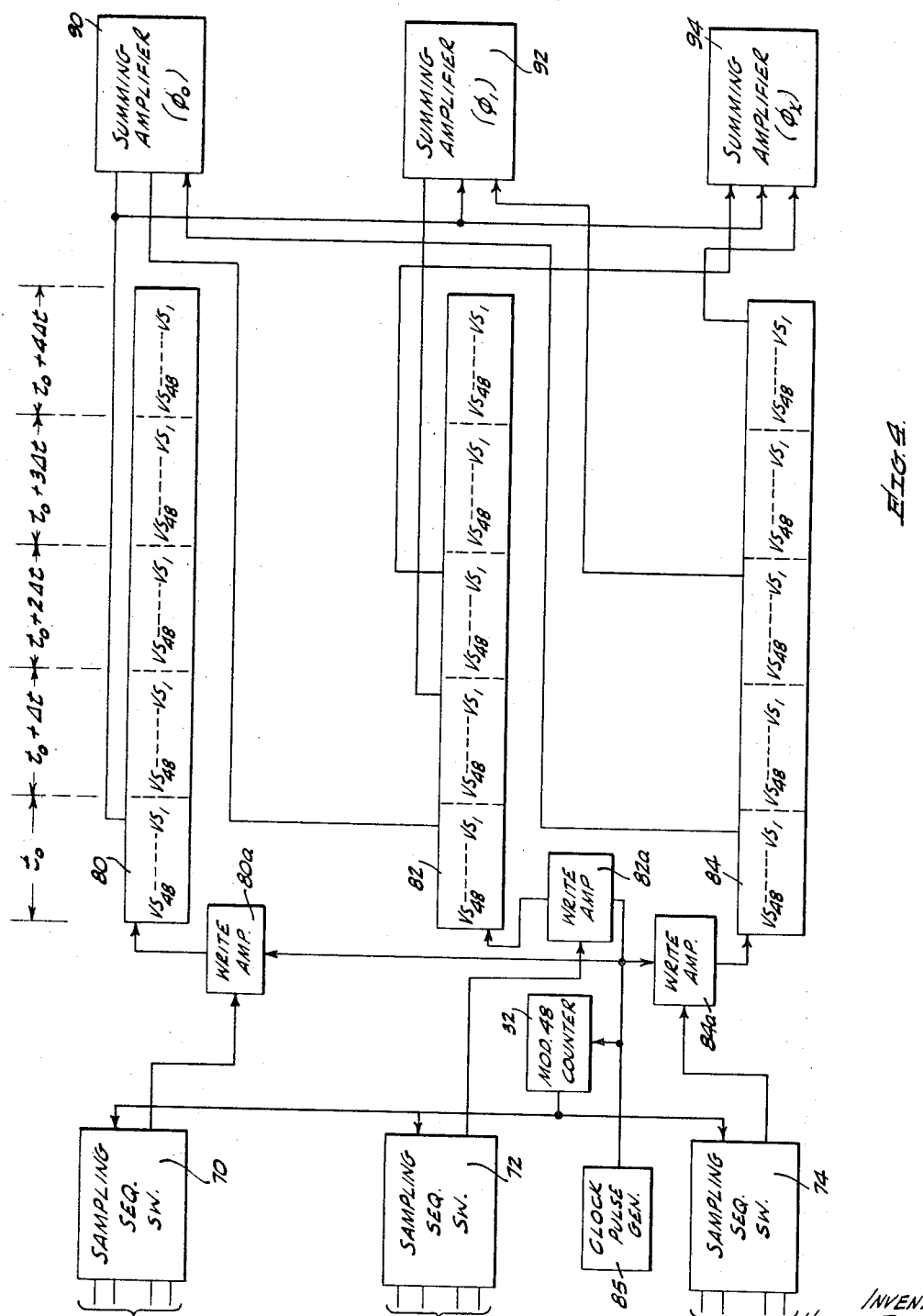

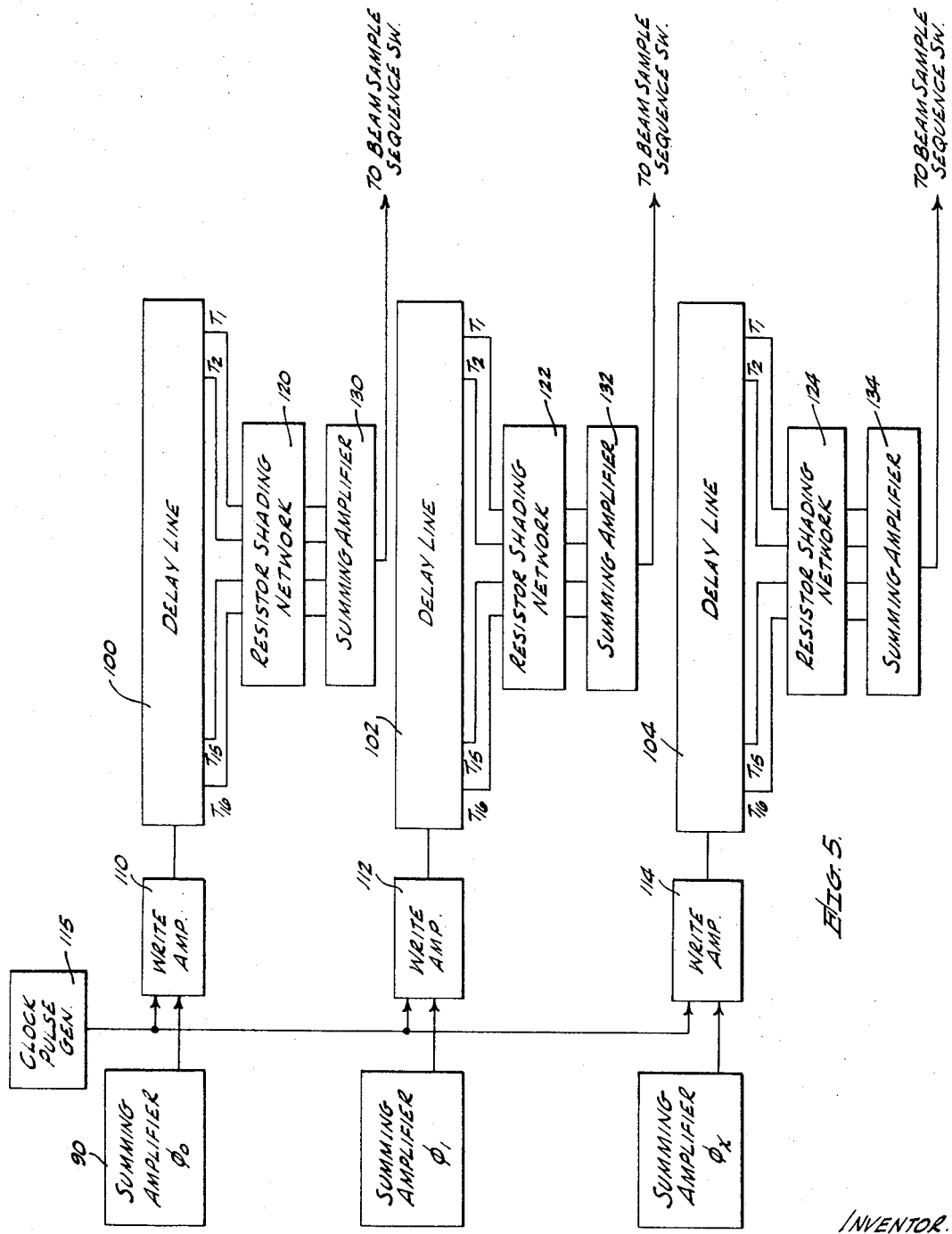

United States Patent Office 3,370,267
Patented Feb. 20, 1968

3,370,267
BEAM FORMING SYSTEM
Harry J. Barry, Fullerton, Calif., assignor to Hughes Aircraft Company, Culver City, Calif., a corporation of Delaware
Filed Oct. 23, 1965, Ser. No. 502,932
16 Claims. (Cl. 340—6)

ABSTRACT OF THE DISCLOSURE

A beam forming system in which output signals of a plurality of staves of a receiving array are sequentially sampled and supplied to a tapped magnetostrictive delay line. The location of the taps along the line correspond to the phase delay required to provide phase coherency between the output signals of a selected number of staves used to form a given beam. The signals applied to each of the output taps of the delay line are coupled to a single multi-input summing amplifier through a side lobe suppression resistor shading network. The delay line is sequentially supplied with samples of the output signals of the plurality of staves, which samples advance therethrough at a selected clock pulse rate so that the output signal from the summation amplifier is a sequence of consecutively ordered summed beam samples.

---

This invention relates to target detection systems, and more particularly to a system for forming signal directivity patterns or beams from signals received by a plurality of receiving elements.

In each of the presently known target detection systems, such as sonar systems, used to detect underwater targets, some technique is employed to combine the signals received by a group of receiving elements, hereafter referred to as staves, so oriented that the signal from each stave is essentially equal in magnitude and different in phase—the phase being a function of the source direction and consequently additive in that direction when phase coherence between the signals of all staves of a selected group chosen to form a beam is achieved by delaying the energy from each of the elements by a time, electrically equal to the acoustic propagation time between staves, or by multiplying the instantaneous value of the voltages from each stave by a factor relative to the phase difference between them. Consequently, the signals from each of the staves of the group arrive in phase at some summing point, such as a summing amplifier, and thus produce a maximum response to acoustic energy from the source direction or target and significantly lesser response for the same energy level from other directions.

One beam forming technique which is presently used employs a compensating plate which mechanically scans all the staves which are part of the receiving array. At any given instance of the scanning operation, the outputs of a group of adjacent staves are capacitively coupled to a corresponding group of delay elements by means of plates. The delay elements provide the required phase delay. As a result, a single beam is formed at any time in a direction which is determined by the position of the compensating plates with respect to the particular group of staves. The compensating plates are rotated rapidly so that several samples from each beam can be obtained during one transmit pulse period, thereby providing surveillance throughout a 360° sector. However, practical limitations on mechanical rotation rate results in an effective sampling rate (slow relative to the information bandwidth) which prevents the beam from being used to derive target doppler data. That is, since the signal inputs from a given direction are essentially discontinuous, an averaging time constant proportional to the pulse width cannot be achieved. In addition, the mechanical scanning process represents a source of system noise.

Another beam forming system, known as digital multibeam steering system has been suggested and described in an article entitled "Digital Array Phasing" by Victor C. Anderson, published in volume 32, page 86, of the Journal of the Acoustical Society of America.

In Figure 1 of the above-referred to article, the system is schematically diagrammed, shown comprising a plurality of shift registers which are used to introduce the required time delay in the signals of the various staves of each group of staves used to form another beam. Briefly, in the digital multi-beam steering system, the outputs of each of the staves are digitized and applied in parallel to the shift registers of such length (or number of stages) and operating at a clock rate such that an adequate sample of the incoming signal is always present in the shift registers. Phase coherence is achieved by summing the outputs from the appropriate stages of selected sets of shift registers. The digital multi-beam steering system does not suffer the signal losses associated with the compensator plate beam forming technique and therefore the beams can be processed for target doppler information. However, as it is appreciated by those familiar with the art, the digital multi-beam steering system requires a number of shift registers which equal the number of staves in the receiving array. Also, since the data is not serialized, a separate summing amplifier and associated circuitry is required for each beam. Also, unless a high sampling frequency relative to the signals is used the resultant beam has side lobes of appreciable levels with respect to the major beam lobe. The consequence is noise acceptance in the direction of the side lobes, i.e., reduction in directivity gain.

Accordingly, it is an object of the present invention to provide a novel beam forming system which is simpler than presently known systems.

Another object of the invention is the provision of a beam forming system for sequentially forming each of a plurality of beams without any substantial loss of received signals.

A further object is to provide a relatively simple beam forming system, utilizing only a single summing amplifier to form each of a plurality of beams, substantially simultaneously.

Still a further object is to provide a beam forming system which has all the advantages of a system in which all the beams are simultaneously formed, but which requires only a single beam forming channel as compared with the multi-channel requirements of the prior art systems.

These and other objects of the invention may be achieved by providing a beam forming system in which the outputs of the plurality of staves of the receiving array which for explanatory purposes is assumed to comprise 48 staves, circularly arranged, are sequentially supplied to a magnetostrictive delay line. The length of the line in time corresponds to the largest delay required. Shorter delays are obtained at output taps which are positioned along the line. Assuming that each beam is formed by combining the outputs of sixteen adjacent staves, the outputs of these staves are extracted from the line at sixteen output taps located at intervals along the line. The locations of the taps will correspond to the beam forming phase delay requirements necessary to provide phase coherence between the sixteen outputs of the sixteen staves used to form any given beam.

Each of the sixteen tap outputs of the delay line is amplified and fed to a single sixteen input summing amplifier, through a resistor shading network, the function of which is to control the relative inputs to the amplifier to provide proper side lobe level suppression. Since the line is sequentially supplied with samples (azimuth ordered) of the outputs of the 48 staves, these samples may be considered to advance through it at a clock pulse rate. Consequently, the output of the summing amplifier is a sequence of consecutive azimuth ordered summed beam samples which occur at a rate exactly equivalent to the rate at which the outputs of the staves are sequentially supplied to the line. A sequence (or decommitating) switch may be used to convert the serially produced beam samples out of the summing amplifier into 48 parallel lines to form each of the 48 beams if so desired or necessary in any specific application.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a diagram useful in explaining the formation of a plurality of beams from an array of staves;

FIGURE 2 is a block and schematic diagram of one embodiment of the present invention;

FIGURE 3 is a diagram of a three dimensional array of staves;

FIGURE 4 is a block diagram of another embodiment of the invention; and

FIGURE 5 is a block diagram of still another embodiment of the invention.

Attention is now directed to FIGURE 1 which is a simplified diagram of a circular receiving array 10 comprising forty-eight staves designated S1 through S48 which are circularly arranged about a center 0. Hereinafter, the invention will be described in conjunction with a 48 stave array, with each beam being formed by combining the output signals or outputs of another group of sixteen staves, it being appreciated that the array may include any desired number and that each beam may be formed by combining the outputs of more or less than sixteen staves.

As is appreciated by those familiar with the art, a signal from a direction 12 comprising of acoustic energy in the form of a plane wave front 14 will arrive at each pair of staves, such as S1 and S48, S2 and S47, S8 and S40. Hereafter the acoustic energy will be referred to as the signal received by the staves. The time of arrival of the signal would differ depending on the distances between the various staves in the direction 12. Assuming that the signal arrives at a first pair of staves S1 and S48 at time $t_0$, then from FIGURE 1 it is apparent that the same signal will arrive at each of the other seven pairs (S2 and S47 through S8 and S40) at some later time depending on the distance between each pair and the first pair of staves and the speed of acoustic propagation.

A directivity pattern or beam B1 for the direction 12 is formed by combining the outputs of saves S41 through S48 and S1 through S8 which are related to the same signal received by this group of staves. However, since the signal arrives at these staves at different times, it is necessary to differentially delay their outputs so that when they are combined, they represent the identical received signal. Since staves S8 and S41 are the last to receive the signal represented by wavefront 14, it is necessary to delay the outputs of each pair of staves with respect to the outputs of the pair of staves S8 and S41 by a time period which is equal to the acoustic propagation speed and the distance ΔL between the particular pair and staves S8 and S41. Thus the outputs of staves S7 and S42 are delayed by a time which is a function of distance ΔL1, whereas the outputs of staves S6 and S43, S5 and S44, S4 and S45, S3 and S46, S2 and S47, and S1 and S48 are proportionally delayed as a function of distances ΔL2 through ΔL7 respectively.

Briefly, it can then be stated that a beam (B1) is effectively formed by differentially delaying the outputs of a group of staves (S41 through S48 and S1 through S8) as a function of the relative positions of the elements in the array with respect to the direction (12) of the beam. Alternately, a beam (B1) can be defined as being a function of the outputs of a group of staves (S41 through S48 and S1 through S8) which are disposed about the center 0 of the array about an arc 18 on a chord 20 between the first (S41) and last (S8) staves of the group with the chord 20 being perpendicular to the direction 12 of the beam. Each of the other beams such as beam B4 from a direction 22 is similarly formed by combining the outputs of staves S44 through S48 and S1 through S11 disposed on an arc 24 on a chord 26 which is perpendicular to the direction 22. Since the forty-eight staves S1 through S48 are equidistantly spaced about the circular array, the relative delays which must be introduced in the outputs of each group of sixteen staves to produce phase coherence is the same.

Reference is now made to FIGURE 2 which is a simplified block diagram of the novel beam forming system of the present invention. The system includes forty-eight stave amplifiers designated A1 through A48, coupled to amplify the outputs of staves S1 through S48 respectively. The outputs of the stave amplifiers are supplied to another input line of a sampling sequence switch 30 which is controlled by a MOD 48 counter 32 driven by clock pulses from a clock pulse generator 35 to sample the input from each clipper amplifier every forty-eight clock pulses or periods.

The switch 30 may include forty-eight switches each one connecting another of its input lines to the switch output line 30a, with each switch being enabled by another gate which in turn is actuated as a function of the signals from counter 32. Thus, for example, when the output signal of the counter 32 represents a number 1, the gate associated with the switch which couples the output of amplifier A1 to line 30a is controlled and when the output of counter 32 represents a number 48, the gate associated with the switch coupling A48 to line 30a is enabled.

The clock pulses are supplied by clock pulse generator 35 at a rate which is a function of the number of staves in the array, i.e. in the present example, forty-eight and the frequency of the signals arriving or received by the staves. Assuming that the transmitted signals to be received by the staves are of a frequency of 10,000 c.p.s. and that 5 samples per cycle are the minimum required to properly reproduce the received signal, the rate of the clock pulses would be $10,000 \times 5 \times 48 = 2.4 \times 10^6$ c.p.s. or 2.4 mc. pulses. Thus the output of the switch 30 on line 30a is a sequence of samples produced by sequentially sampling the forty-eight inputs thereto. For every clock pulse, the switch 30 produces a sample of one of its inputs which is related to the output of another of the forty-eight staves so that after forty-eight clock periods, the switch produces a sequence of forty-eight samples each one being related to the output of another of the staves. Defining the clock rate or frequency of the generator 35 as Q and the forty-eight elements as N, the sampling rate of the ouput of each element or stave may be defined as Z where $Z=Q/N$.

Each sample from switch 30 is supplied to a magnetostrictive type delay line 40 through a write amplifier 42 which is gated to write in or supply to the line 40 each of the samples in response to each clock pulse or during each clock period. Thus after 48 clock pulses, hereafter referred to as a sampling period, a sample of the output of each of the staves is stored in the line. The delay line 40 may be thought of as consisting of a plurality of storage stages each one being capable of storing a sample supplied thereto from switch 30. Furthermore, the samples advance along the line from one stage to the next every clock pulse or clock period. Thus during the first sampling period, forty-eight samples are stored in the first forty-eight storage stages of the line 40. Assuming a clock pulse rate of 2.4 mc. pulses each pulse period is about 0.417 microsecond so that a complete sampling period is only 20 microseconds long, which when considering the propagation speed of acoustic energy, is an extremely short time interval and therefore the complete sampling period may be thought of as occurring substantially instantaneously.

The length of the delay line 40 is chosen as a function of the maximum time delay required which is related to $\Delta L7$ shown in FIGURE 1, and the rate at which samples are stored in the line. In FIGURE 2, the line 40 is diagrammed as comprising n x 48 storage stages, with forty-eight samples being stored during each of the sampling periods designated SP1 through SP$n$. SP$n$ represents the last sampling period and SP1 represents the first period. The samples of the staves S1 through S48 in each of the sampling periods are designated by P1 through P48 respectively in the delay line 40.

In accordance with the teachings of the invention, the delay line 40 is provided with sixteen tap outputs T1 through T16 which are connected to sixteen of the storage stages thereof, in which at any given instant samples from a particular group of sixteen adjacent staves are stored. At the instant diagrammed in FIGURE 2, samples from the sixteen staves S1 through S8 and S41 through S48 used to form beam B1 are stored in the sixteen stages which are coupled to the sixteen taps T1 through T16. As previously explained in conjunction with FIGURE 1, the outputs of staves S1 and S48 must be delayed with respect to the outputs of staves S1 and S41 by a time $\Delta T$ which is a function of the acoustic propagation and the distance $\Delta L7$. This is accomplished by coupling the taps T1 and T2 to storage stages in which samples from S48 and S1 are stored which are spaced from the storage stages in which the samples from S8 and S41 are stored by a line length through which samples advance in a time $\Delta T$. Similarly, the other taps (T3 through T16) are coupled to storage stages along the line with respect to the stages to which taps T1 and T2 are connected so that at any given instant the samples in the storage stages to which the taps are connected represent the outputs of sixteen staves in response to the same input signal or acoustic energy.

Taps T1 through T16 are connected to a summing amplifier 45 through resistors R1 through R16 respectively which in essence comprise a resistor shading network 47 providing appropriate sidelobe suppression by proper selection of resistive values as is well known in the art. Thus the output of the summing amplifier 45 is a function of the samples stored in the sixteen storage stages which are related to the same signal received by sixteen of the staves. In FIGURE 1, these samples are assumed to be from staves S11 through S48 and S1 through S8 so that the output of amplifier 45 is a sample of beam B1. During the next clock pulse, all the samples in the line advance by one stage so that the samples in the sixteen stages to which the sixteen taps are coupled are from staves S42 through S48 and S1 through S9. Consequently, during that clock period, the output of the summing amplifier 45 is a sample of a beam B2 (see FIGURE 2).

From the foregoing, it is thus seen that the output of the summing amplifier 45 is a sequence of consecutive summed azimuth ordered beam samples occurring at a rate equivalent to the input sampling rate. The output of the amplifier 45 may then be supplied to a beam sample sequencing switch 50 which responds to counter 32 to sequentially supply the serial beam outputs of the summing amplifier 45 to 48 parallel output lines L1 through L48 so that the signals on each line represent the directivity pattern or beam from another direction. The output lines are connected to a sonar processing system which analyzes each beam for target detection. When desired switch 50 may be eliminated with the output of amplifier 45 being used to provide a sequence of beam samples in serial form.

From the foregoing description, it should be appreciated that the beam forming system of the present invention forms a plurality of 48 beams through the use of a single delay line and only one summing amplifier. By comparison, the digital multi-beam steering system of the prior art herebefore referred to, requires a shift register and a summing amplifier for each stave, thus requiring 48 shift registers and 48 summing amplifiers each with system inputs for a system which is capable of producing as many beams as the novel system of the invention. The use of a single amplifier in addition to reducing the cost and complexity of the system eliminates the need of carefully controlling the gain stability of a plurality of amplifiers in order to stabilize the amplitude of parallel beam channels.

As previously explained, the amount of phase delay required for the output of each stave is determined by the physical location of the stave with respect to the direction of the beam and by the acoustical propagation speed. The actual delay achieved, however, is determined by the discrete delay increment provided by delay line 40. The result is a best possible fit to the required time delays and consequently some phase errors occur which in turn cause some loss of the signal processing gain and, more importantly, some degradation in pattern. In addition to the magnitude of the phase error, the stave at which the error occurs is significant. Although not a linear function, the shading factor applied to signals received by each stave is such that the nearer the stave is physically located with respect to the center axis or direction of the beam being formed, the more significant the data and consequently the more detrimental is its phase error.

As seen from FIGURE 2, the samples from staves S1 and S48 at taps T2 and T1 which are combined to form beam B1 are in response to signals received by staves S1 and S48 one clock period apart, while those of S2 and S47 at taps T4 and T3 respectively are three clock periods apart. These errors, if significant in a particular application, may be greatly reduced by increasing the rate at which the samples are clocked into the line 40 so that the phase error corresponding to a clock period is reduced. Another technique which in the light of the foregoing description may become apparent to those familiar with the art is to supply samples from the outputs of the forty-eight staves to two lines such as delay line 40 through two sampling sequence switches. The two switches could be programmed to supply samples from the more significant staves (such as staves S48 and S1 in connection with beam B1) in time coincidence so as to eliminate any time delay therebetween.

In the foregoing description, it has been assumed that the signal or acoustic energy wavefront, such as that designated by numeral 14 in FIGURE 1, is perpendicular to a plane of the array 10. It is appreciated however, that the wavefront may approach in any angular direction with respect to the array. Referring to FIGURE 3 there is shown an isometric view of a circular array 60 as comprising a plurality of vertical staves VS1 through VS48. Each vertical stave comprises a plurality of $n$ receiving elements E1 through E$n$, only E1, E2 and E$n$ being diagrammed in FIGURE 3. All the receiving elements with the same subscript are in the same horizontal plane, so that each group of elements comprises a single line receiving array.

The receiving array 60 is particularly adapted to receive and distinguish between acoustic energy the wavefront of which forms any one of a plurality of angles with respect to the array 60. Let us assume that in FIGURE 3, lines 65, 66 and 67 represent wavefronts of acoustic energy or signals from directions 65$x$, 66$x$ and 67$x$. Assuming further that signal from direction 65$x$ arrives at a zero depression angle with respect to the array 60, then the signals from directions 66x and 67x may be thought of as arriving at $\phi1$ and $\phi x$ depression angles respectively. The subscript x represents that the energy may be arriving from any one of x different depression angles.

As previously stated, array 60 is particularly adapted to distinguish between signals or acoustic energy the wavefronts of which are at different depression angles with respect to the array. As seen from FIGURE 3, the acoustic energy at wavefront 65 from direction 65x arrives at all the elements (E) of each vertical stave (VS) in phase, whereas the energy arriving at any depression angle will arrive at the various E elements in a phase relationship which is a function of the depression angle. For example, the phase relationship or difference in time of arrival of wavefront 65 at En and E1 of VS1 is less than the time of arrival difference of wavefront 67 at the same two elements. These time of arrival differences are conveniently detected by an arrangement which is diagrammed in simplified form in FIGURE 4 to which reference is made herein. As seen, sampling sequence switches 70, 72 and 74 sequentially sample the respective outputs of the E1, E2 and En layers or elements of vertical staves VS1 through VS48. As in the embodiment shown in FIGURE 2 switches 70, 72 and 74 are controlled by the MOD 48 counter 32 and the clock pulse generator 85 to sequentially sample the inputs thereof. The sampled outputs or samples from switch 70, 72 and 74 are supplied to delay lines 80, 82 and 84 through write amplifiers 80a, 82a and 84a respectively. The amplifiers are controlled by clock pulses from the clock pulse generator 85 so that the samples supplied to each line are stored at a rate of one sample per clock pulse, in a manner similar to that described in conjunction with FIGURE 2.

During each sampling period comprising forty-eight clock periods, forty-eight samples are stored in each of the delay lines. In FIGURE 4, $t_0$ through $t_0+4\Delta t$ represent five sampling periods, $t_0$ being the latest and $t_0+4\Delta t$ being the first of the periods. The arrangement also includes summing amplifiers 90, 92 and 94 which are connected to various stages of the lines to combine the samples which are stored in these stages at a particular instant. For example amplifier 90 is connected to stages of lines 80, 82 and 84 which store samples of the outputs of all the E elements of a given vertical stave (VS) which arrive at the same instant, i.e. zero depression angle designated by $\phi0$. Thus the ouput of amplifier 90 is a maximum only when the wavefront of the acoustic energy arriving at array 60 is perpendicular to the array plane such as wavefront 63 (FIGURE 3).

Similarly, amplifiers 92 and 94 are connected to lines 80, 82 and 84 so that they will produce maximum outputs when the wavefronts of the acoustic energy arriving at array 60 arrives at depression angles $\phi0$ and $\phi x$ respectively. Thus, at any given instant the outputs of amplifiers 90, 92 and 94 are a function of the depression angle of arrival of the acoustic energy wavefront at the E elements of a particular vertical stave being sampled. At the instant diagrammed in FIGURE 4, the samples related to outputs of the E elements of VS1 are combined so that the outputs of amplifiers 90, 92 and 94 are related to the depression angle and the signal received by E1 through En of VS1. Then during each subsequent clock pulse, the inputs to amplifiers 90, 92 and 94 which are azimuth ordered are from the E elements of another vertical stave, VS.

From FIGURES 3 and 4, in light of the foregoing description, it is appreciated that the output of each of amplifiers 90, 92 and 94 is a series of outputs related to the signals received at each of the E elements in another plane in array 60 such as the E1 elements of vertical staves VS1 through VS48 and another depression angle such as $\phi0$. The outputs of each of the summing amplifiers may be supplied to a delay line identical with delay line 40 herebefore described, which together with a shading network and a summing amplifier may produce a sequence of azimuthly ordered, horizontally summed beam samples. It should be pointed out that the number of the delay lines such as lines 80, 82 and 84 is related to the number of E elements in each vertical stave VS. Thus for three elements, three lines are required. However the number of summing amplifiers such as 90, 92 and 94 is related to the number of depression angles to be sensed. Thus the lines 80, 82 and 84 may be coupled to any number x of summing amplifiers.

Referring to FIGURE 5, there is shown summing amplifiers 90, 92 and 94 connected to delay lines 100, 102 and 104 through write amplifiers 110, 112 and 114 which are controlled by clock pulses from a clock pulse generator 115 which is similar to generator 85 in FIGURE 4 to store the samples from each of the amplifiers in another of the lines. The delay lines may be of the magnetostrictive type or of any known type. Each of the lines has sixteen taps designated T1 through T16 connected to another resistor shading network designated 120, 122 and 124 in FIGURE 5 for the three lines. Each resistor shading network which is similar to network 47 of FIGURE 1 is connected to another summing amplifier which produced a sequence of beam samples as herebefore described. In FIGURE 5, the summing amplifiers associated with networks 120, 122 and 124 are designated by numerals 130, 132 and 134 respectively. Each of the summing amplifiers 130, 132 and 134 may be connected to another beam sample sequence switch, such as switch 50, to convert the beam samples from each summing amplifier into forty-eight beams to be supplied to a sonar processing system to detect an unidentified target in any of the beams. Also each summing amplifier may be connected to a beam stabilization switch matrix to provide descrete stabilization of the received beam at any selected depression angle or angles for any conditions of the ship's motion, such as its roll or pitch.

From the foregoing, it should thus be appreciated that whereas in the embodiment of the invention diagrammed in FIGURE 1, only one set of forty-eight beams are produced and supplied to the sonar processing system, in the embodiment of the invention diagrammed in FIGURES 3, 4 and 5, a set of forty-eight beams is formed for each desired depression angle $\phi$. Thus the formed beams may be analyzed to derive not only the azimuth and range of an unidentified target, but also the depression angle between the direction of the target and the receiving array 60 (FIGURE 3), so that the exact location of a target from the array can be derived.

There has accordingly been shown and described a novel beam forming system for forming signal directivity patterns or beams to detect an unidentified target or targets by processing each of the beams. According to the teachings disclosed herebefore, each set of beams is formed by combining signal samples stored in another magnetostrictive type delay line. A plurality of lines may be used to derive beams which are a function of the depression angle ($\phi$) which each target forms with the receiving array, thereby providing an additional variable for defining the location of each target with respect to the array.

It should be appreciated that those familiar with the art may make modifications in the arrangements shown without departing from the true spirit of the invention. Therefore, all such modifications and equivalents are assumed to fall within the scope of the appended claims.

What is claimed is:

1. A beam forming system, responsive to the outputs of N receiver elements arranged in a predetermined array to receive signals from all directions, for forming a plurality of receiving beams, each beam being a function of the outputs of another group of J elements in said array which are oriented with respect to the direction of said beam comprising:

means for sequentially sampling the outputs of said N elements and providing a succession of output samples;

delay line means including a plurality of storage stages;

clock pulse generating means for providing clock pulses at a predetermined rate Q;

means, responsive to said succession of output samples and said clock pulses, for storing said samples in said delay line means at said predetermined rate Q, each of the stored samples advancing one storage stage per clock pulse; and output means, including tap means coupled to J storage stages of said delay means, for forming a beam sample as a function of the samples stored in said J storage stages, whereby the samples sequentially stored in said J storage stages are output samples of another group of J receiver elements having a predetermined orientation with respect to the direction of another beam and said output means form another beam sample each clock pulse.

2. The beam forming system defined in claim 1 wherein said output means further includes, resistive means for selectively varying the relative amplitudes of the samples stored in said J storage elements as a function of the orientation of said J elements, and summing means coupled to said resistive means, for providing another beam sample each clock pulse.

3. The beam forming system defined in claim 1 further including counter means coupled to said means for sequentially sampling and to said clock pulse generating means to control the sampling of the outputs of said N elements at the predetermined rate Q of said clock pulses.

4. The beam forming system defined in claim 3 further including:

J taps each connected to another of said J storage stages;

summing means having J inputs and at least one output; and means for connecting said J taps to said J inputs and for controlling the output of said summing means, representing a beam sample, to be a function of the samples stored in said J storage stages.

5. The beam forming system defined in claim 4 wherein said summing means has N outputs, and said counter means energizes said summing means to sequentially apply its output beam sample to another of said N outputs; whereby the beam samples, corresponding to the output samples of another group of J receiver elements, are applied to another of said N outputs of said summing means.

6. The beam forming system defined in claim 1 wherein the minimum number of stages of said delay line means is a function of the predetermined clock rate Q, the number N of said receiver elements and their arrangement in said array and the propagation speed of said received signals in the direction of said beam.

7. A beam forming system responsive to the output of each of N receiver elements arranged in a circular array to receive signals from all directions for forming a plurality of receiving beams, each beam being a function of the outputs of another group of J receiver elements in said array which are disposed about an arc on a chord between the first and last elements of said group of J elements, said chord being perpendicular to the direction of said beam comprising:

a source for providing clock pulses at a predetermined rate Q;

means for sequentially sampling the outputs of said N elements and providing a sequence of output samples, each set of N samples comprising a sample of the output of each of said N elements;

delay line means having a plurality of storage stages for storing said sequence of samples at said predetermined rate in the storage stages of said delay line means each sample being stored during one clock pulse period and advancing one storage stage per clock pulse;

J taps connected to J storage stages of said delay line means for providing the J samples stored therein, said J stages being distributed along said delay line means as a function of the relative distance of said J elements with respect to said chord, the acoustic propagation time between said J elements of a signal propagating in the direction of said beam and the rate of said clock pulses; and output means coupled to said J taps for forming a beam sample as a function of the samples stored in said J storage stages.

8. The beam forming system defined in claim 7 further including a counter responsive to the clock pulses to control said means for sequentially sampling to sample the outputs of said N elements at said predetermined clock rate whereby the output of each receiver element is sampled at a rate equal to Q/N.

9. The beam forming system defined in claim 8 wherein said predetermined clock rate Q is a function of N, the maximum frequency of the signals received by said receiver elements, and the number of samples per cycle required to reproduce signals of said maximum frequency.

10. The beam forming system defined in claim 9 further including amplitude control means disposed between said J taps and said output means for selectively controlling the amplitudes of the samples from said J storage stages as a function of the relative distances of said J elements with respect to said chord said output means comprising summing means responsive to the output of said amplitude control means for forming said beam, whereby another beam is formed for another group of J receiver elements each clock pulse.

11. In a target detection system, including a receiving array of N receiver elements for receiving acoustic signals from all directions with respect to said system, a beam forming system responsive to the signals received by each of said N elements for forming a plurality of beams, each beam being formed by combining outputs of another group of J receiver elements, the outputs being differentially delayed as a function of the relative positions of the J elements in said array with respect to the direction of the beam formed and the acoustic propagation time between elements comprising:

delay means comprising a plurality of storage stages;

clock pulsing means for providing clock pulses at a predetermined rate Q, which is a function of N and the frequency of the received acoustic signals;

means for sequentially sampling the outputs of said N receiver elements at said predetermined rate Q;

means response to said clock pulses and the sampled outputs of said N elements for storing at said predetermined rate Q the sampled outputs of said N elements in said delay means, wherein the stored samples advance from one stage to another each clock pulse;

J taps connected to J storage stages along said delay means for providing J output signals corresponding to the sampled outputs stored in said J stages, the relative position of said J stages along said delay means being a function of the relative positions of any adjacent group of J elements in said array with respect to the direction of a beam to be formed and the acoustic propagation time between said J elements in said direction; and output means for receiving the samples stored in said J stages to provide a beam sample as a function of the relative amplitudes of said samples which represent the output samples of J adjacent elements in said array, whereby said output means forms another beam sample each clock pulse.

12. The beam forming system defined in claim 11 wherein each receiver element is a vertical stave comprised of X receiving transducers, whereby said array includes X times N receiving transducers, N transducers being arranged in a circular receiving array in another plane; and means for providing a sample of the output of each vertical stave which is a function of the acoustic signals received by the receiving transducers thereof and the angular direction of said acoustic energy with respect to said array.

13. In a target detection system wherein acoustic energy reflected by a target is received and analyzed a beam forming system to provide beam samples indicative of the azimuth and depression angle of said target with respect to a receiving array the system comprising:

a receiving array including N receiving vertical staves circularly arranged, each stave comprising of X elements, each element of each stave being in a different one of X planes whereby another N of said elements are disposed in another plane;

X delay means each comprising a plurality of storage stages;

a source of clock pulses provided at a predetermined rate;

means for sequentially sampling the outputs of the N elements in each of said planes and storing the sampled outputs of the elements in another plane in another of said X delay means, whereby each output sample is clocked during a clock pulse with the stored output samples advancing in each of said delay means from one storage stage to another each clock pulse;

S summing means each connected to one storage stage of each of said X delay means to provide during each clock pulse period an output which is a function of the acoustic energy received by the X elements of another of said N staves and a preselected depression angle of the direction of the acoustic energy with respect to said array;

S delay means each comprising a plurality of storage stages;

means for connecting the output of each of said S summing means to another of said S delay means;

means for sequentially clocking the output of each of said summing means into one of said S delay means associated therewith;

J taps associated with each of said S delay means said taps being connected to J stages in each of said S delay means wherein outputs of J adjacent staves in said array are coincidently stored; and S output means each connected to J taps of another of said S delay means for providing during each clock pulse period an output beam sample which is a function of the acoustic energy received by J adjacent staves at a different depression angle.

14. The system defined in claim 13 wherein each of said S output means comprises output summing means for summing the outputs stored in the J storage stages associated with the J taps of another of said S delay means and shading network means disposed between said output summing means and said J taps to control the side lobes of each output beam sample.

15. The system defined in claim 14 wherein said means for sequentially sampling includes a counter responsive to said clock pulses for sampling during each clock period the outputs of the X elements of another stave and for storing the sampled outputs of each element in another of said X delay means, and said S summing means has at least one output line to serially provide thereon beam samples of each beam samples being a function of the acoustic energy received by another group of adjacent J staves and a different depression angle.

16. In a target detection system, a beam forming system to receive acoustic energy from a target by transducers of a receiving array and to determine the azimuth and depression angle of said target with respect to said array the beam forming system comprising:

a receiving array including N receiving vertical staves circularly arranged, each stave comprising X receiving transducers, each transducer of each stave being in a different one of X planes;

delay and summing means for combining the signals received by the transducers of each stave in S different phase relationships to provide S sequences of output samples, each sequence representing the energy received by said N staves for a different depression angle;

S means for storing said S sequences of output samples; and

S means each for combining J selected output samples in another of said S sequences to provide beam samples, each beam sample being a function of the acoustic energy received by J adjacent staves at a depression angle related to the particular sequence.

References Cited

UNITED STATES PATENTS 2,897,351  7/1959  Melton _____ 343—113
3,039,094  6/1962  Anderson _____ 343—113
3,163,844  12/1964  Martin _____ 340—6

RICHARD A. FARLEY, *Primary Examiner.*